US008965171B2

(12) United States Patent
Akaishi

(10) Patent No.: US 8,965,171 B2
(45) Date of Patent: Feb. 24, 2015

(54) RECORDING CONTROL APPARATUS, RECORDING CONTROL METHOD, STORAGE MEDIUM STORING RECORDING CONTROL PROGRAM

(71) Applicant: Canon Kabushiki Kaisha, Tokyo (JP)

(72) Inventor: Masao Akaishi, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/865,761

(22) Filed: Apr. 18, 2013

(65) Prior Publication Data

US 2013/0287362 A1    Oct. 31, 2013

(30) Foreign Application Priority Data

Apr. 26, 2012    (JP) .................. 2012-101584

(51) Int. Cl.
*H04N 5/77* (2006.01)
*H04N 9/79* (2006.01)
*H04N 5/765* (2006.01)

(52) U.S. Cl.
CPC ............... *H04N 9/79* (2013.01); *H04N 5/765* (2013.01); *H04N 5/772* (2013.01)
USPC ...................................... 386/224

(58) Field of Classification Search
USPC .......................... 386/200, 223, 224
See application file for complete search history.

(56) References Cited

U.S. PATENT DOCUMENTS

| | | | |
|---|---|---|---|
| 2007/0180474 A1* | 8/2007 | Park et al. ................... | 725/58 |
| 2009/0121850 A1* | 5/2009 | Tanaka et al. ............. | 340/426.24 |
| 2010/0165109 A1* | 7/2010 | Lang ............................. | 348/158 |
| 2010/0271478 A1* | 10/2010 | Oya ............................. | 348/143 |
| 2011/0229105 A1* | 9/2011 | Khan et al. ................. | 386/200 |

FOREIGN PATENT DOCUMENTS

JP    2007-251646 A    9/2007

* cited by examiner

*Primary Examiner* — Huy T Nguyen
(74) *Attorney, Agent, or Firm* — Rossi, Kimms & McDowell LLP

(57) ABSTRACT

A recording control apparatus that is capable of recording a video image at the time of starting motion detection before an event generation without setting pre-event recording time. A detection unit detects a moving subject in a video image. A setting unit sets a type of an event that is generated when specified time elapses after the detection unit detects a moving subject. A control unit stores the video image into an storage unit from the detection of the moving subject by the detection unit until recording time corresponding to the type of the event set by the setting unit elapses.

17 Claims, 6 Drawing Sheets

RECORDING CONTROL APPARATUS, RECORDING CONTROL METHOD, STORAGE MEDIUM STORING RECORDING CONTROL PROGRAM

BACKGROUND OF THE INVENTION

1. Field of the Invention

The present invention relates to a recording control apparatus, a recording control method, and a storage medium storing a recording control program.

2. Description of the Related Art

Conventionally, since a video monitoring system containing a recording control apparatus generates a detection event to start recording after recognizing an image when detecting and recording a moving subject, an image at the time when the moving subject came into a taking area is not recorded. Accordingly, images before generation of an event are necessarily stored in a storage medium in order to record the image at the time when the moving subject came into the taking area.

For example, Japanese Laid-Open Patent Publication (Kokai) No. 2007-251646 (JP 2007-251646A) discloses that images before generation of an event are stored in a primary database, and that a live video image for post-event playback time designated is stored in an secondary database when an event occurs. Then, if a request from a monitor station is received after the storing of the live video image, the video image for pre-event playback time designated will be acquired from the primary database, the acquired video image and the video image for the post-event playback time stored in the secondary database will be made into the continuous stream, and it will be distributed to the monitor station.

However, the technique disclosed in the above-mentioned publication has a problem of requiring complicated operations because of necessity to designate the pre-event playback time and the post-event playback time.

SUMMARY OF THE INVENTION

The present invention provides a recording control apparatus, a recording control method, and a storage medium storing a recording control program, which are capable of recording a video image at the time of starting motion detection before an event generation without setting pre-event recording time.

Accordingly, an aspect of the present invention provides a recording control apparatus comprising a detection unit configured to detect a moving subject in a video image, a setting unit configured to set a type of an event that is generated when specified time elapses after the detection unit detects a moving subject, and a control unit configured to store the video image into an storage unit from the detection of the moving subject by the detection unit until recording time corresponding to the type of the event set by the setting unit elapses.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
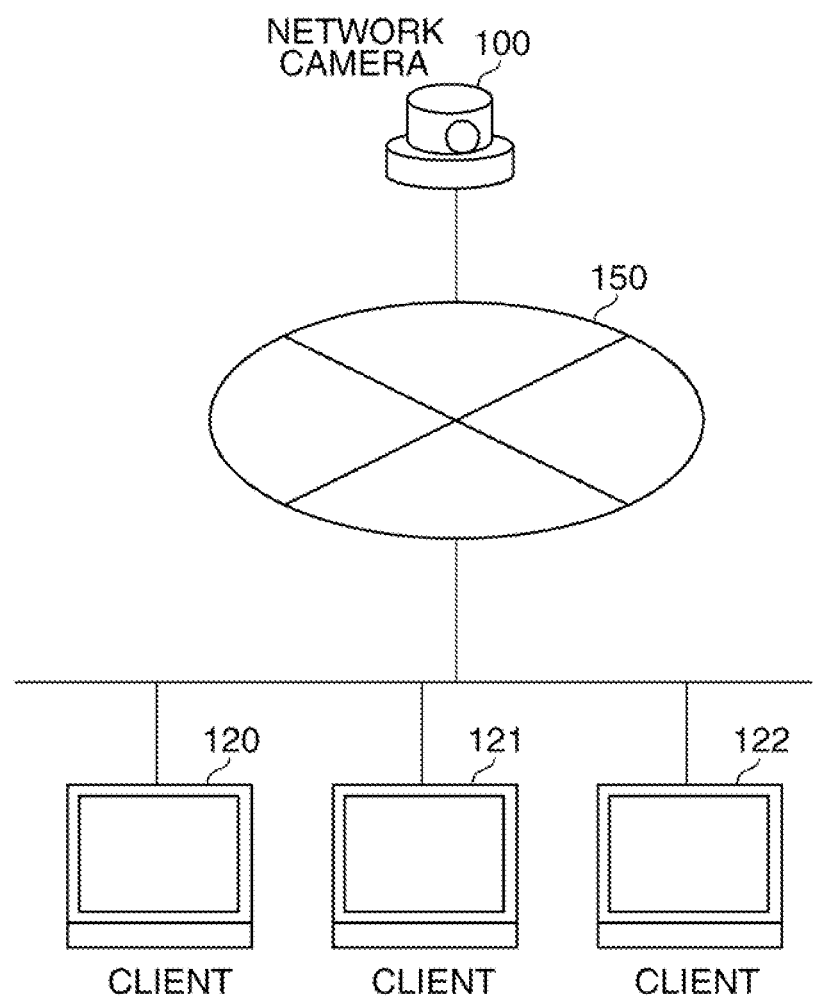
FIG. 1 is a view showing a configuration example of a video monitoring system including a recording control apparatus according to an embodiment of the present invention.

FIG. 1 is a view showing a configuration example of a video monitoring system including a recording control apparatus according to the embodiment. As shown in FIG. 1, the video monitoring system of this embodiment consists of a network camera 100, clients 120, 121, and 122, and a network 150 that connects the network camera 100 with the clients 120, 121, and 122. The program which controls the network camera 100 using the communications protocol for camera control is included in the clients 120, 121, and 122. The video monitoring system of this embodiment performs an image recognition process using images taken by the network work camera 100 that functions as a recording control apparatus.

Figure 2:
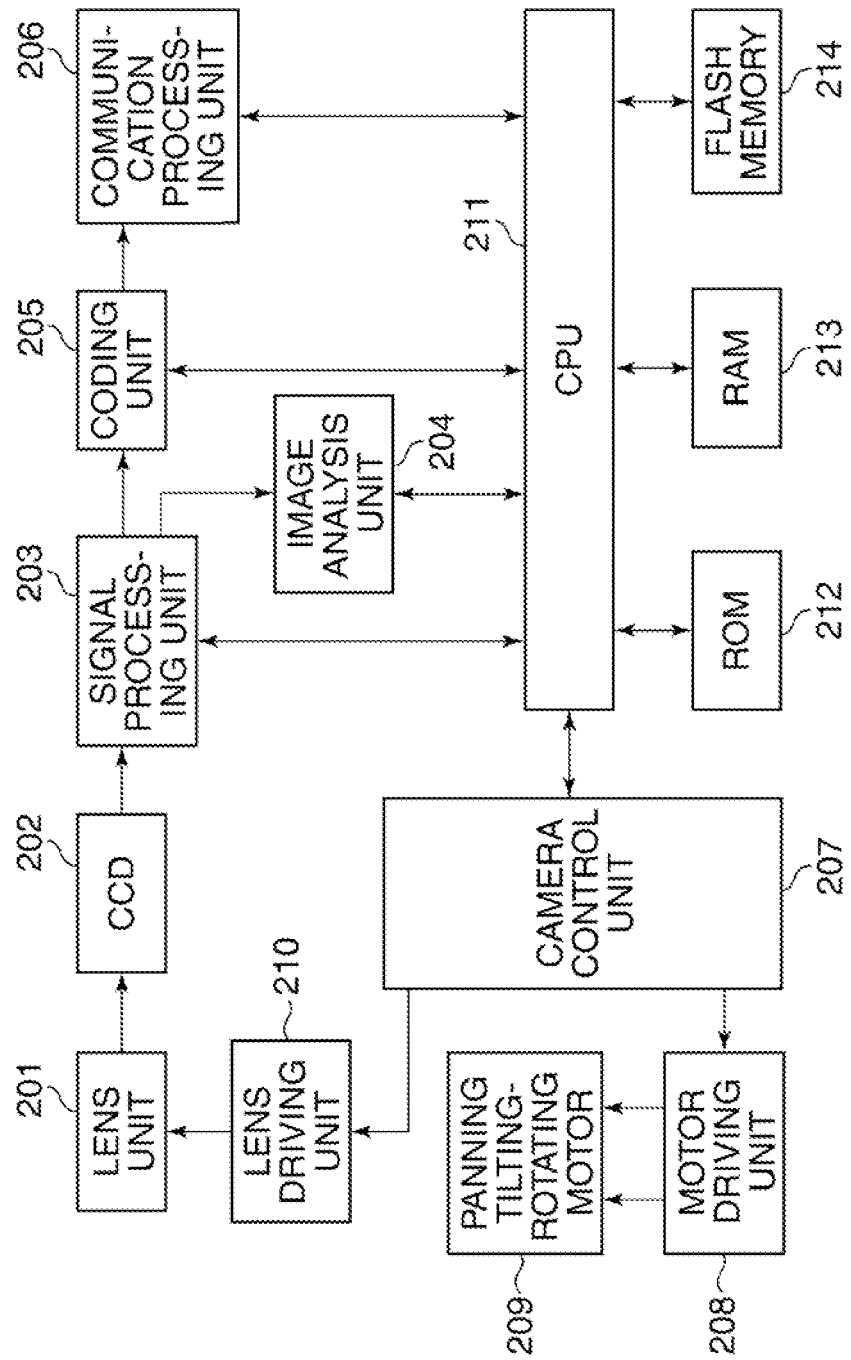
FIG. 2 is a block diagram schematically showing a configuration example of a network camera shown in FIG. 1 that functions as the recording control apparatus.

FIG. 2 is a block diagram schematically showing the entire configuration of the network camera 100 according to this embodiment. Although FIG. 2 shows an example where the network camera 100 contains a camera section and a server section in a single unit, the present invention allows constructing the camera section and the server section as separate sections. When the sections are separated, the present invention may be configured as a server that is a recording control apparatus that records images.

The camera section of the network camera 100 is provided with a lens unit 201, a CCD 202, a signal processing unit 203, an image analysis unit 204, a coding unit 205, and a communication processing unit 206 as shown in FIG. 2.

In the following, a process executed until video image data taken by the network camera 100 is distributed to the network 150 will be described. An optical image formed through the lens unit 201 is converted into RGB digital data by the CCD 202, and then, the converted data is sent to the signal processing unit 203. The signal processing unit 203 performs a process for converting the RGB digital data into digital data in the YCbCr4:2:0 format or YCbCr4:2:2 format, a process for converting the size of the digital data into an image size of a required transmission video image, various filtering processes, etc., and generates image data.

The generated image data is sent to the coding unit 205 and to the image analysis unit 204 at the same time. The coding unit 205 codes and compresses the image data in the H.264 format or JPEG format. The video stream data in the H.264 format or JPEG still image data generated by the coding unit 205 is distributed to each client by the communication processing unit 206 via the network 150 according to a network protocol, such as TCP/IP, HTTP, or RTP. In this embodiment, the data is distributed to the clients 120, 121, and 122.

The image analysis unit 204 analyzes the taken image data and determines whether the target image includes a subject or an image pattern that matches a designated condition. Each of the signal processing unit 203, the image analysis unit 204, the coding unit 205, and the communication processing unit 206 is connected with the below-mentioned CPU 211.

A camera control unit 207 is connected with a motor driving unit 208 and a lens driving unit 210. The camera control unit 207 outputs control signals for panning, tilting, and rotating operations of the camera, and for zooming and auto-focusing operations according to instructions from the below-mentioned CPU 211.

The motor driving unit 208 is provided with a motor drive circuit etc., and drives a panning-tilting-rotating motor 209 according to the control signal from the camera control unit 207. The shooting direction of the camera can be changed by rotating the panning-tilting-rotating motor 209. A lens driving unit 210 is provided with motors and motor drive circuits for zooming and auto-focusing, and is controlled according to control signals from the camera control unit 207.

The CPU (central processing unit) 211 controls the operation of the entire apparatus by executing control program codes stored in the below-mentioned ROM 212. The ROM (read-only memory) 212, a RAM (random access memory) 213, and a flash memory 214 are connected with the CPU 211.

Moreover, the CPU 211 is connected with the signal processing unit 203, the image analysis unit 204, the coding unit 205, and the communication processing unit 206. The CPU 211 controls each module by instructing to start and stop an operation, to set an operating condition, to acquire an operation result, etc. The below-mentioned flowchart describes operations of the CPU 211 in detail.

The ROM 212 stores a program code, such as an application process, and data for the CPU 211 to control this apparatus. The CPU 211 reads and writes data from and into the RAM 213 when executing the program stored in the ROM 212. This RAM 213 has a work area that the CPU 211 uses for executing the program to control the apparatus, a temporal retreat area, etc.

Figure 3:
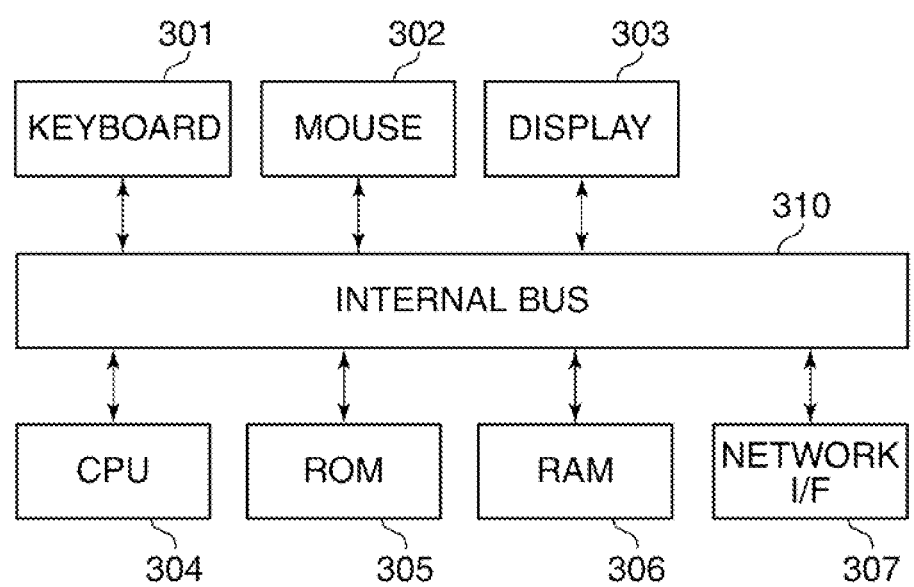
FIG. 3 is a block diagram schematically showing a configuration example of a client shown in FIG. 1 that functions as a controller.

Next, the entire configuration of the clients 120, 121, and 122 prepared in FIG. 3 as a controller in the embodiment is shown.

Each of the clients 120, 121, and 122 is configured so that a keyboard 301, a mouse 302, a display 303, a CPU 304, a ROM 305, a RAM 306, and a network I/F 307 are mutually connected through an internal bus 310. Common input devices that give instructions are used for the keyboard 301 and the mouse 302. A common output unit is used for the display 303.

Figure 4:
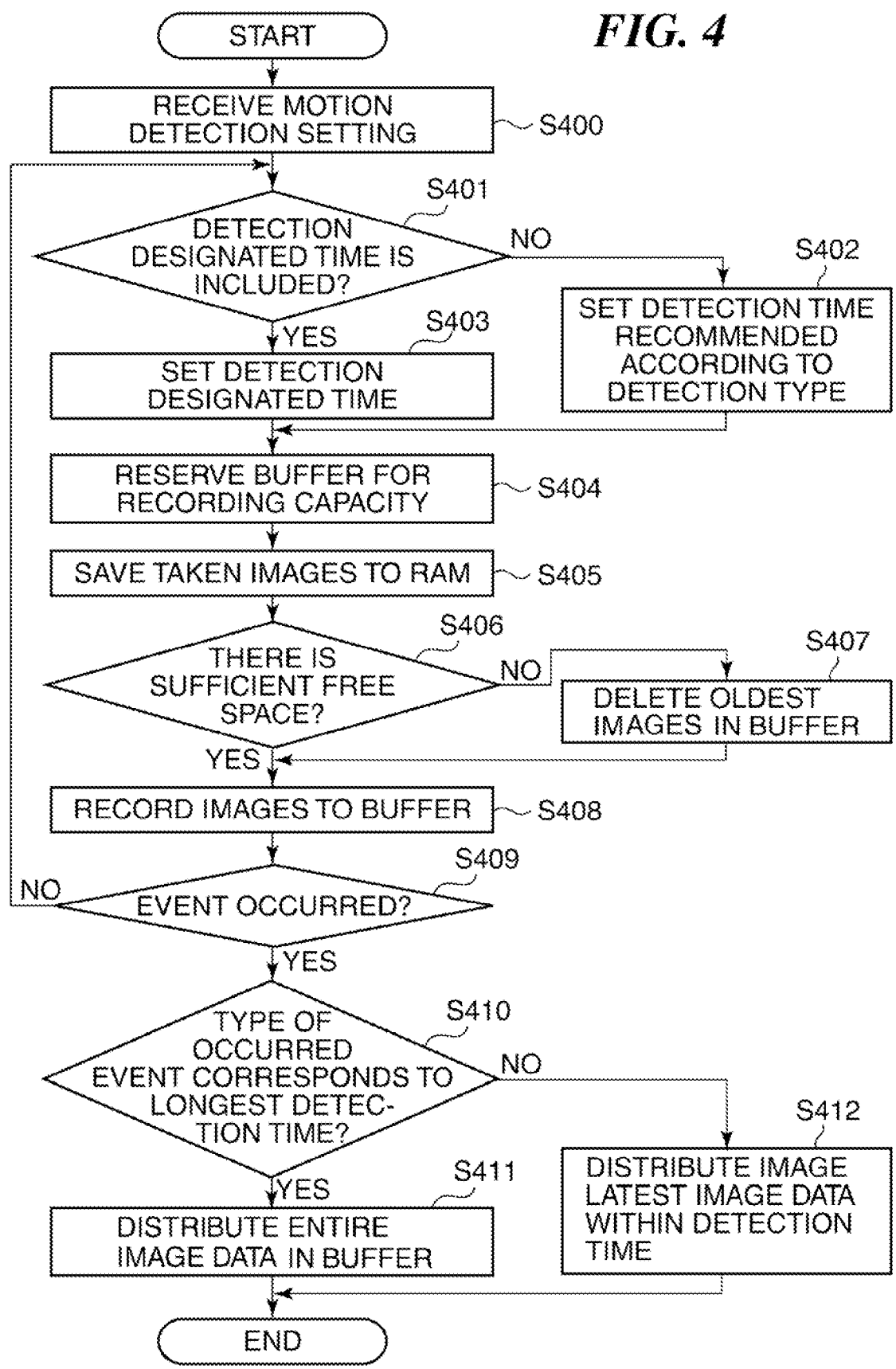
FIG. 4 is a flowchart showing an example of a control process of the network camera shown in FIG. 2.

FIG. 4 is a flowchart showing an example of a control process of software executed by the CPU 211 of the network camera 100 that is a recording control apparatus. Hereinafter, this control process will be described in detail.

The CPU 211 receives a motion detection setting (step S400). That is, if the motion detection setting is transmitted from the client 120, 121, or 122 that is a controller, the communication processing unit 206 will execute a motion-detection-setting receiving process. The motion detection setting received in the step S400 includes a detection type and detection designated time of the motion detection.

The detection types in this embodiment include: (1) a desertion detection meaning that a physical object continues to exist during a fixed time after the physical object was placed; (2) a removing detection meaning that a physical object continues not to exist during a fixed time after the physical object was carried away; (3) a tampering detection meaning that variation in the most screen continues during a fixed time; etc. In the tampering detection, an event is generated when the CPU 211 detects that a predetermined variation occurs in a region beyond a specified size in a screen and the variation continues for a predetermined period.

The CPU 211 determines whether detection designated time is included in the motion detection setting received in the step S400 (step S401), and detection designated time is set up according to the motion detection setting (step S403) when it is designated. When it is not designated, the CPU 211 acquires a detection time setting recommended according to a detection type designated by the motion detection setting from the ROM 212, and sets up (step S402).

The CPU 211 reserves a buffer in the flash memory 214 for storing a video image within the detection time set in the step S402 or S403 and storing it temporarily (step S404). Thereby, the video image taken within the detection time can be recorded. When an increment of the detection time is designated in the motion detection setting transmitted from the client 120, 121, or 122, the buffer size is determined by adding the increment to the buffer size reserved in the step S404. The addition of the increment of the buffer size will be described later.

The CPU 211 receives the images taken by the CCD 202 via the coding unit 205, and saves them to the RAM 213 (step S405). Next, the CPU 211 determines whether the buffer in the flash memory 214 has a free space for recording the images received in the step S405 (step S406). When there is sufficient buffer capacity, the process proceeds to step S408. When there is insufficient buffer capacity, the CPU 211 sequentially deletes the images from the oldest one recorded in the buffer until the sufficient capacity for recording the images received in the step S405 is reserved (step S407). Then, the process proceeds to the step S408.

Next, the CPU 211 records the image data received in the step S405 to the buffer secured in the flash memory 214 (the step S408). Thereby, the video image corresponding to the detection time of the occurred event can be recorded.

In step S409, the CPU 211 determines whether an event occurred based on the result analyzed by the image analysis unit 204. When no event occurred, the process for receiving the motion detection setting in the step S400 is executed again. When an event occurred, the CPU 211 determines whether the type of the occurred event corresponds to the longest detection time among the detection types in step S410.

When the occurred event corresponds to the longest detection time (YES in the step S410), the entire image data recorded in the buffer in the flash memory 213 is distributed to the clients 120, 121, and 122 (step S411). When the occurred event does not correspond to the longest detection time (NO in the step S410), the latest image data within the detection time recorded in the buffer in the flash memory 214 is distributed to the clients 120, 121, and 122 (step S412). Accordingly, the video image within the detection time set in the step S402 or S403 is recorded into the buffer in the flash memory 214, and the recorded image data is distributed to the clients 120, 121, and 122.

Figure 5:
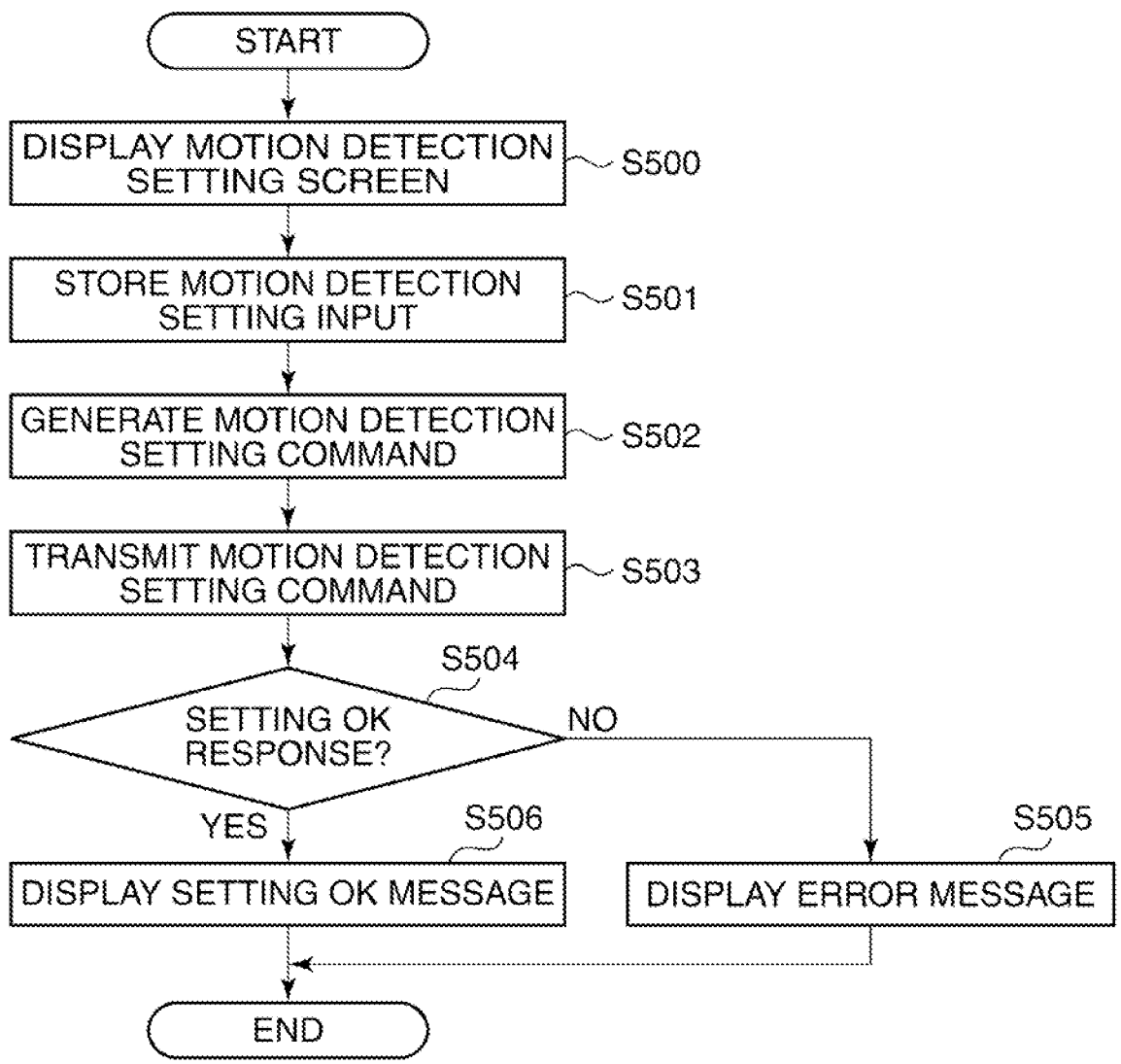
FIG. 5 is a flowchart showing an example of a control process executed by the controller shown in FIG. 3.

FIG. 5 is a flowchart showing a software control executed by the CPU 304 shown in FIG. 3 in the clients 120, 121, and 122 that are controllers. Hereafter, the process will be described in detail with reference to the flowchart in FIG. 5.

When a display of a motion detection setting screen is required by an input through the keyboard 301 or the mouse 302, the CPU 304 displays a motion detection setting screen (step S500). When a motion detection setting is inputted through the keyboard 301 or the mouse 302, the CPU 304 stores it to the RAM 306 (step S501). The CPU 304 generates a motion detection setting command (step S502), and transmits the generated motion detection setting command to the network camera 100 (step S503).

The CPU 304 waits for a response from the network camera 100 (step S504). When the CPU 304 received an NG response or did not receive any response, the CPU 304 displays an error message meaning failure of the motion detection setting to the network camera 100 on the display 303 (step S505). Moreover, when receiving an OK response, the CPU 304 displays a setting OK message meaning success of the motion detection setting to the network camera 100 on the display 303 (step S506).

Since the present invention eliminates the need to set the time to record images before an event generation, operations can be simplified. Moreover, since the suitable recording time can be automatically set for every detection type, it is possible to record an operation of a surveillance object completely.

Figure 6:
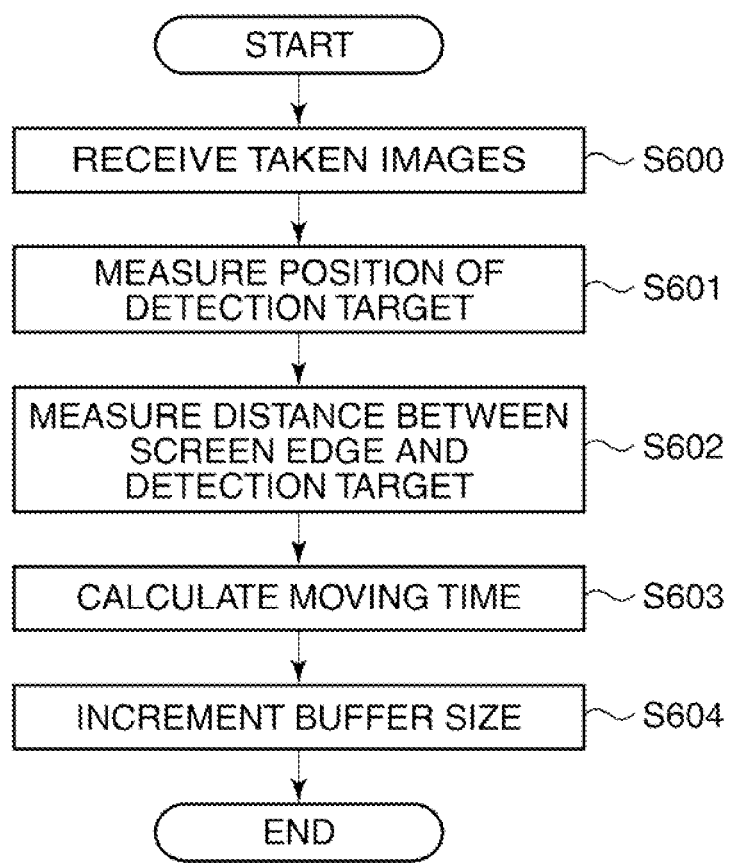
FIG. 6 is a flowchart showing an example of a buffer's increment calculation process in the network camera shown in FIG. 2.

Hereinafter, the process of adding the increment of the recording buffer before an event generation in the above-mentioned step S404 will be described with reference to the flowchart shown in FIG. 6.

The signal processing unit 203 of the network camera 100 receives images taken by the CCD 202 (step S600), and generates image data. The image analysis unit 204 measures a position of a detection target (moving subject) included in the image data generated by the signal processing unit 203 (step S601). Moreover, the image analysis unit 204 measures the length from the edge of the taking area of the taken image to the position of the detection target, and measures the distance between the screen edge and the detection target (step S602).

The CPU 211 calculates moving time by dividing the length from the edge of the taking area to the detection target measured in the step S602 by an average walking speed as the increase of the detection time (step S603). The average walking speed is calculated as the average of movement speeds of all the persons detected by the image analysis unit 204. Thereby, the increment of the detection time becomes the time required to move at the average walking speed.

The CPU 211 adds the increment of the detection time to the detection time, and extends the buffer capacity reserved in the flash memory 214. This allows the clients to set the recording time using the arbitrary time before the generation of the detection event as the increment of the recording buffer.

As mentioned above, although the desirable embodiment of the present invention was described, the present invention is not limited to the embodiment. Various modifications and variations are possible within the scope of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-101584, filed on Apr. 26, 2012, which is hereby incorporated by reference herein in its entirety.

What is claimed is:

1. A recording control apparatus comprising:
    an image pickup unit configured to change a taking area of a video image;
    a setting unit configured to set one of a plurality of types of events that are generated based on a detection of a moving subject in the video image;
    a determination unit configured to determine, according to the taking area of said image pickup unit and a movement speed of the moving subject in the video image, a period for storing at least part of the video image before generation of a detection event of at least one of the plurality of types of events; and
    a control unit configured to store, if a first type of event is set by the setting unit, the video image related to the first type of event into a first storage unit for a first period which corresponds to the first type of event, and store, if a second type of event is set by the setting unit, the video image related to the second type of event into the first storage unit for a second period which corresponds to the second type of event.

2. The recording control apparatus according to claim 1, wherein said determination unit is configured to determine the movement speed of a specific moving subject based on movement speed of the specific moving subject that is detected by said image pickup unit before the generation of the detection event.

3. A recording control apparatus comprising:
    a setting unit configured to set one of a plurality of types of events that are generated if each period corresponding to each event elapses after a motion in a video image is detected by a detection unit; and
    a control unit configured to store, if a first type of event is set by the setting unit, the video image related to the first type of event into a first storage unit at least from the detection of the motion in the video image until a first period, which corresponds to the first type of the event, elapses, and store, if a second type of event is set by the setting unit, the video image related to the second type of event into the first storage unit at least from the detection of the motion in the video image until a second period, which corresponds to the second type of the event, elapses.

4. The recording control apparatus according to claim 3, wherein the plurality of types of events includes a desertion detection for generating an event when a physical object continues to exist during a predetermined period after the physical object was placed.

5. The recording control apparatus according to claim 3, wherein the plurality of types of events includes a removing detection for generating an event when a physical object continues not to exist during a predetermined period after the physical object was carried away.

6. The recording control apparatus according to claim 3, wherein the plurality of types of events includes a tampering detection for generating an event when predetermined variation occurs in a region beyond a specified size in a screen and the variation continues for a predetermined period.

7. The recording control apparatus according to claim 3, further comprising:
   a second storage unit configured to temporarily store the video image that will be stored in said first storage unit; and
   a determination unit configured to determine a capacity of said second storage unit according to a period which corresponds to the type of the event set by said setting unit.

8. The recording control apparatus according to claim 7, wherein
   said setting unit is configured to set a plurality of types of events; and
   said determination unit is configured to determine the capacity of said second storage unit according to a longer period among periods of time corresponding to the plurality of types of events set by said setting unit.

9. A recording control apparatus comprising:
   an setting unit configured to set one of a plurality of types of events that are generated if each period corresponding to each event elapses after each predetermined variation corresponding to the each event occurs in a screen; and
   an control unit configured to store, if a first type of event is set by the setting unit, the video image related to the first type of event into the first storage unit at least from an occurrence of a first predetermined variation corresponding to the first type of event until the first period, which corresponds to the first type of the event, elapses, and store, if a second type of event is set by the setting unit, the video image related to the second type of event into the first storage unit at least from an occurrence of a second predetermined variation corresponding to the second type of event until the second period, which corresponds to the second type of the event, elapses.

10. A recording control method comprising:
    a changing step of changing a taking area of an image pickup unit which takes a video image;
    a setting step of setting one of a plurality of types of events that are generated based on a detection of a moving subject in the video image;
    a determining step of determining, according to the taking area of said image pickup unit and a movement speed of the moving subject in the video image, a period for storing at least part of the video image before generation of a detection event of at least one of the plurality of types of events; and
    a controlling step of controlling a first storage unit to store, if a first type of event is set, the video image related to the first type of event into the first storage unit for a first period which corresponds to the first type of event, and store, if a second type of event is set, the video image related to the second type of event into the first storage unit for a second period which corresponds to the second type of event.

11. A recording control method comprising:
    a setting step of setting one of a plurality of types of events that are generated if each period corresponding to each event elapses after a motion in a video image is detected; and
    a controlling step of controlling a first storage unit to store, if a first type of event is set, the video image related to the first type of event into the first storage unit at least from the detection of the motion in the video image until a first period, which corresponds to the first type of the event, elapses, and store, if a second type of event is set, the video image related to the second type of event into the first storage unit at least from the detection of the motion in the video image until a second period, which corresponds to the second type of the event, elapses.

12. The recording control method according to claim 11, further comprising:
    a controlling step of controlling a second storage unit to temporarily store the video image that will be stored in said first storage unit; and
    a determining step of determining a capacity of said second storage unit according to a period which corresponds to the type of the set event.

13. A recording control method comprising:
    a setting step of setting one of a plurality of types of events that are generated if each period corresponding to each event elapses after each predetermined variation corresponding to the each event occurs in a screen; and
    a controlling step of controlling a first storage unit to store, if a first type of event is set, the video image related to the first type of event into the first storage unit at least from an occurrence of a first predetermined variation corresponding to the first type of event until the first period, which corresponds to the first type of the event, elapses, and store, if a second type of event is set, the video image related to the second type of event into the first storage unit at least from an occurrence of a second predetermined variation corresponding to the second type of event until the second period, which corresponds to the second type of the event, elapses.

14. The recording control method according to claim 13, further comprising:
    a controlling step of controlling a second storage unit to temporarily store the video image that will be stored in said first storage unit; and
    a determining step of determining a capacity of said second storage unit according to a period which corresponds to the type of the set event.

15. A non-transitory computer-readable storage medium that stores computer-executable instructions for recording control, the storage medium comprising:
    computer-executable instructions for changing a taking area of an image pickup unit which takes a video image;
    computer-executable instructions for setting one of a plurality of types of events that are generated based on a detection of a moving subject in the video image;
    computer-executable instructions for determining, according to the taking area of said image pickup unit and a movement speed of the moving subject in the video image, a period for storing at least part of the video image before generation of a detection event of at least one of the plurality of types of events; and
    computer-executable instructions for controlling a first storage unit to store, if a first type of event is set, the video image related to the first type of event into the first storage unit for a first period which corresponds to the first type of event, and store, if a second type of event is set, the video image related to the second type of event into the first storage unit for a second period which corresponds to the second type of event.

16. A non-transitory computer-readable storage medium that stores computer-executable instructions for recording control, the storage medium comprising:
    computer-executable instructions for setting one of a plurality of types of events that are generated if each period corresponding to each event elapses after a motion in a video image is detected; and
    computer-executable instructions for controlling a first storage unit to store, if a first type of event is set, the video image related to the first type of event into the first storage unit at least from the detection of the motion in the video image until a first period, which corresponds to the first type of the event, elapses, and store, if a second type of event is set, the video image related to the second type of event into the first storage unit at least from the detection of the motion in the video image until a second period, which corresponds to the second type of the event, elapses.

17. A non-transitory computer-readable storage medium that stores computer-executable instructions for recording control, the storage medium comprising:

computer-executable instructions for setting one of a plurality of types of events that are generated if each period corresponding to each event elapses after a motion in a video image is detected; and computer-executable instructions for controlling a first storage unit to store, if a first type of event is set, the video image related to the first type of event into the first storage unit at least from an occurrence of a first predetermined variation corresponding to the first type of event until the first period, which corresponds to the first type of the event, elapses, and store, if a second type of event is set, the video image related to the second type of event into the first storage unit at least from an occurrence of a second predetermined variation corresponding to the second type of event until the second period, which corresponds to the second type of the event, elapses.

* * * * *